(12) United States Patent
Snapp et al.

(10) Patent No.: US 7,440,908 B2
(45) Date of Patent: Oct. 21, 2008

(54) METHOD AND SYSTEM FOR SELECTING A SALES CHANNEL

(75) Inventors: Lawrence Snapp, Manhattan Beach, CA (US); Jeffrey S. Rogers, Reston, VA (US); Michael A. Nardella, Sicklerville, NJ (US); Morris A. Davis, Arlington, VA (US)

(73) Assignee: Jabil Global Services, Inc., St. Petersburg, FL (US)

( * ) Notice: Subject to any disclaimer, the term of this patent is extended or adjusted under 35 U.S.C. 154(b) by 662 days.

(21) Appl. No.: 10/203,542

(22) PCT Filed: Feb. 9, 2001

(86) PCT No.: PCT/US01/04247

§ 371 (c)(1),
(2), (4) Date: Mar. 21, 2003

(87) PCT Pub. No.: WO01/59668

PCT Pub. Date: Aug. 16, 2001

(65) Prior Publication Data

US 2003/0233246 A1 Dec. 18, 2003

Related U.S. Application Data

(60) Provisional application No. 60/185,713, filed on Feb. 29, 2000, provisional application No. 60/181,931, filed on Feb. 11, 2000.

(51) Int. Cl.
*G06F 17/30* (2006.01)

(52) U.S. Cl. .......................................... 705/10; 705/7
(58) Field of Classification Search .................... 705/1, 705/400, 7, 10
See application file for complete search history.

(56) References Cited

U.S. PATENT DOCUMENTS

| 5,337,253 | A | 8/1994 | Berkovsky et al. ........... 364/479 |
| 6,067,525 | A | 5/2000 | Johnson et al. ................ 705/10 |
| 6,115,691 | A | 9/2000 | Ulwick ........................... 705/7 |
| 6,415,270 | B1 * | 7/2002 | Rackson et al. ........... 705/36 R |
| 6,879,962 | B1 * | 4/2005 | Smith et al. .................... 705/22 |
| 6,915,276 | B2 * | 7/2005 | Foster et al. ................... 705/26 |

OTHER PUBLICATIONS

Operations Research- Applications and Algorithms, Third Edition, Duxbury Press, 1994.*
Quantative Forecasting Methods, Furman et al., PWS-Kent Publishing Company, 1989.*
Proquest "(Zygon: Zygon alerts UK market to the danger of multi-channel retailing and distribution", Dec. 16, 1999, Presswire Coventry, p. 1.*

* cited by examiner

*Primary Examiner*—Romain Jeanty
(74) *Attorney, Agent, or Firm*—Price, Heneveld, Cooper, DeWitt & Litton, LLP

(57) ABSTRACT

A processor-assisted method for selecting a sales channel for a specific item (4900). The disclosed method includes analyses of variables such as expected costs (4600), sales items (4100) and market, third party and/or internal data (4200).

18 Claims, 6 Drawing Sheets

JOINT PROBABILITY TABLE:

|  |  | PROCESSOR | | |
|---|---|---|---|---|
|  |  | INTEL | BUDGET | |
| HARD DRIVE SIZE | >=2MB | 0.40 | 0.20 | 0.60 |
|  | <2MB | 0.05 | 0.35 | 0.40 |
|  |  | 0.45 | 0.55 | 1.00 |

MARGINAL PROBABILITY TABLE:

| P(INTEL) | 0.45 |
|---|---|
| P(>=2MB) | 0.60 |

CONDITIONAL PROBABILITY TABLE:

| P(INTEL \| >=2) | 0.67 |
|---|---|
| P(INTEL \| <2) | 0.13 |
| P(BUDGET \| >=2) | 0.33 |
| P(BUDGET \| <2) | 0.88 |
| P(>=2 \| INTEL) | 0.89 |
| P(<2 \| INTEL) | 0.11 |
| P(>=2 \| BUDGET) | 0.36 |
| P(<2 \| BUDGET) | 0.64 |

BENEFIT TABLE:

| OUTCOME | PROCESSOR | HARD DISK | CHANNEL | BENEFIT |
|---|---|---|---|---|
| 1 | INTEL | >=2MB | ONLINE AUCTION | $ 200.00 |
| 2 | INTEL | >=2MB | LIQUIDATION | $ 120.00 |
| 3 | INTEL | <2MB | ONLINE AUCTION | $ 150.00 |
| 4 | INTEL | <2MB | LIQUIDATION | $ 90.00 |
| 5 | INTEL | UNCHECKED | ONLINE AUCTION | $ 100.00 |
| 6 | INTEL | UNCHECKED | LIQUIDATION | $ 70.00 |
| 7 | BUDGET | >=2MB | ONLINE AUCTION | $ 100.00 |
| 8 | BUDGET | >=2MB | LIQUIDATION | $ 90.00 |
| 9 | BUDGET | <2MB | ONLINE AUCTION | $ 60.00 |
| 10 | BUDGET | <2MB | LIQUIDATION | $ 70.00 |
| 11 | BUDGET | UNCHECKED | ONLINE AUCTION | $ 40.00 |
| 12 | BUDGET | UNCHECKED | LIQUIDATION | $ 60.00 |
| 13 | UNCHECKED | >=2MB | ONLINE AUCTION | $ 140.00 |
| 14 | UNCHECKED | >=2MB | LIQUIDATION | $ 100.00 |
| 15 | UNCHECKED | <2MB | ONLINE AUCTION | $ 90.00 |
| 16 | UNCHECKED | <2MB | LIQUIDATION | $ 80.00 |
| 17 | UNCHECKED | UNCHECKED | ONLINE AUCTION | $ 30.00 |
| 18 | UNCHECKED | UNCHECKED | LIQUIDATION | $ 50.00 |

FIG.5

APPLICATION OF TABLES

QUESTIONS: 1. "KNOWING PROCESSOR TYPE AND CHANNEL-RELATED BENEFITS, DO WE INSPECT HARD DISK SIZE?"

2. "KNOWING PROCESSOR TYPE AND HARD DISK SIZE, WHICH CHANNEL SHOULD WE USE?"

SCENARIO 1: PROCESSOR = INTEL

STEP 1 CHOOSE MAXIMUM EXPECTED BENEFIT IF INSPECTED.
= P(>=2 | INTEL)*ONLINE AUCTION BENEFIT + P(<2 | INTEL)*ONLINE AUCTION BENEFIT
= (.89)*200 + (.11)*150
= $194.44

STEP 2 CHOOSE MAXIMUM EXPECTED BENEFIT IF NOT INSPECTED.
= (1)*LIQUIDATION BENEFIT
= $100.00

STEP 3 IS THE INCREMENTAL EXPECTED BENEFIT OF INSPECTION GREATER THAN THE COST OF INSPECTION?
$194.44 − 100.00 > $30
$94.44 > $30 YES!

STEP 4 INSPECT AND CHOOSE BENEFIT MAXIMIZING CHANNEL BASED ON VALUE OF HARD DISK SIZE.

SCENARIO 2: PROCESSOR = BUDGET

STEP 1 CHOOSE MAXIMUM EXPECTED BENEFIT IF INSPECTED.
= P(>=2 | BUDGET)*ONLINE AUCTION BENEFIT + P(<2 | BUDGET)*LIQUIDATION BENEFIT
= (.36)*100 + (.64)*70
= $80.91

STEP 2 CHOOSE MAXIMUM EXPECTED BENEFIT IF NOT INSPECTED.
= (1)*LIQUIDATION BENEFIT
= $60.00

STEP 3 IS THE INCREMENTAL EXPECTED BENEFIT OF INSPECTION GREATER THAN THE COST OF INSPECTION?
$80.91 − 60.00 > $30
$20.91 > $30 NO!

STEP 4 DO NOT INSPECT PROCESSOR AND CHOOSE BENEFIT MAXIMIZING CHANNEL.

FIG.6

METHOD AND SYSTEM FOR SELECTING A SALES CHANNEL

CROSS-REFERENCE TO RELATED APPLICATION

This invention relates to, claims priority to, and incorporates by reference herein in its entirety, each of the following pending U.S. patent applications:

Ser. No. 09/579,464, titled "Method and System for Evaluating a Product", filed May 26, 2000;

Ser. No. 09/560,812, titled "System and Method for Managing Returned Goods", filed Apr. 28, 2000;

Ser. No. 60/185,713, titled "System and Method for Managing Returned Goods—Part 2", filed Feb. 29, 2000; and Ser. No. 60/181,931, titled "System and Method for Managing Returned Goods", filed Feb. 11, 2000.

FIELD OF THE INVENTION

The present invention relates to the field of sales, and, more particularly, to a method and system for selecting a sales channel.

BRIEF DESCRIPTION OF THE DRAWINGS

The invention will be more readily understood through the following detailed description, with reference to the accompanying drawings, in which:

FIG. 5 is a collection of tables exemplifying an embodiment of method 40 of the present invention.

FIG. 6 is an outline applying an exemplary embodiment of method 40 of the present invention using the exemplary tables of FIG. 5.

DETAILED DESCRIPTION

Figure 1:
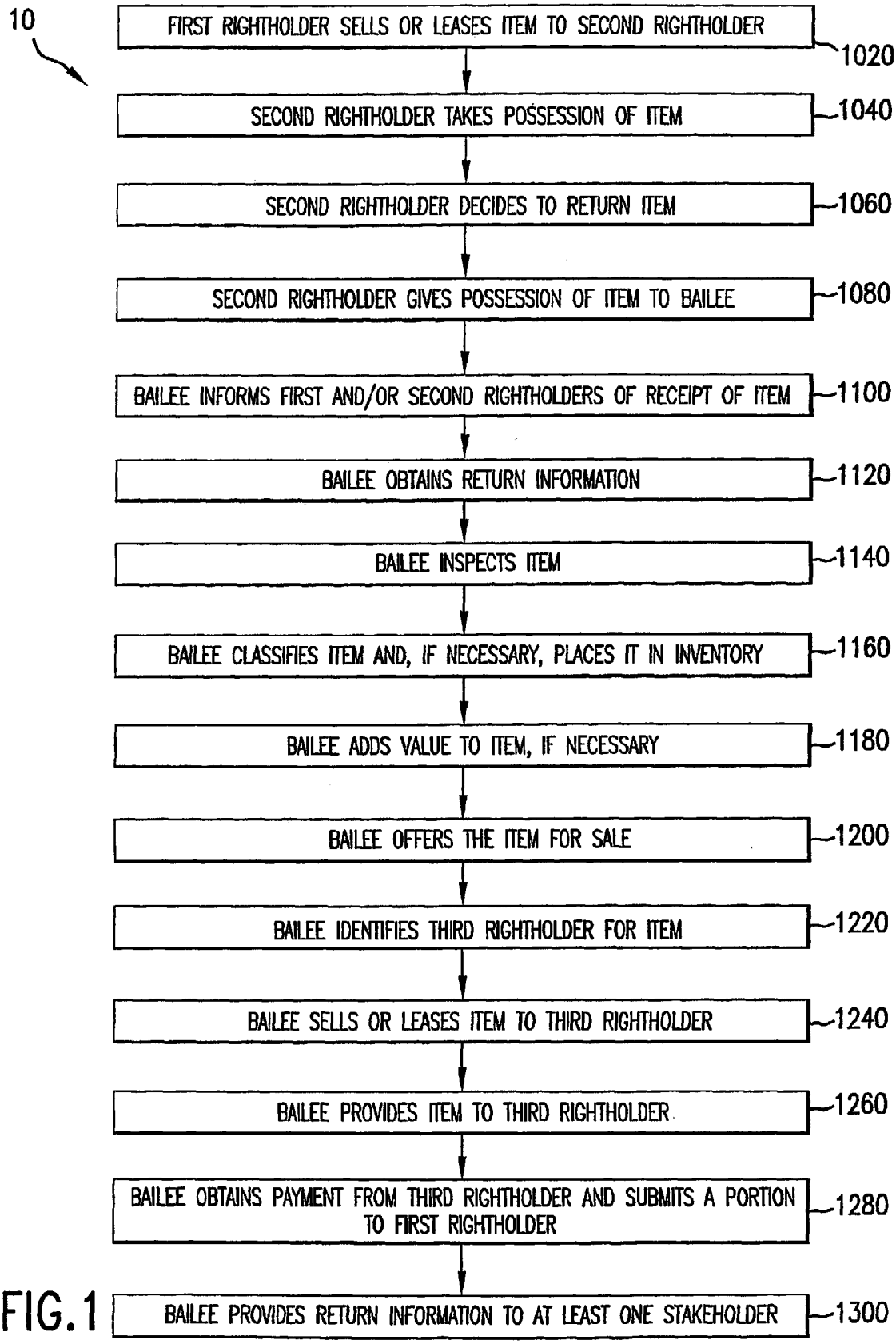
FIG. 1 is a flowchart of an exemplary embodiment of a method 10 of the present invention.

Embodiments of the present invention provide a method for managing a change in rightholders for an item. A method of one embodiment includes receiving the item by a bailee from a second rightholder, a right for the item having previously transferred from one of a plurality of first rightholders to the second rightholder. The method also includes, after receipt of the item, facilitating a return of the right for the item from the second rightholder to the first rightholder. The method further includes appraising the item and identifying a third rightholder for the item.

Embodiments of the present invention also provide a method for managing Z-goods. A method of one embodiment includes receiving from a financial intermediary an authorization regarding a Z-good. The method also includes receiving the Z-good from a provider at a central location, classifying the Z-good into one of a plurality of classifications, and identifying a purchaser for the Z-good.

Embodiments of the present invention further provide a method for providing a description of an item. A method of one embodiment includes receiving an item, recording a verbal description of the item, linking the verbal description to a textual description of the item, and rendering the descriptions to a potential rightholder of the item.

Embodiments of the present invention also provide a processor-assisted method for selecting a sales channel for a specific item. The method includes, for a set of items, the set associated with one or more channel variables, each channel variable having a plurality of channel values, the set also associated with a plurality of item variables, each item variable having a plurality of item values, identifying each possible combination of channel values and item values. The method also includes, with a processor, comparing a statistically determined expected cost to a statistically determined expected benefit of each possible combination to determine an optimal combination, and offering a specific item for sale on a channel having the channel values of the optimal combination.

An "item" (or "Z-good") can be any tangible personal property, such as, for example, a product, a bundled group of products, and/or a product bundled with a service. An "owner" or "titleholder" of an item of tangible personal property can hold numerous rights in that property. Those rights can include the right to possess, use, alienate, and/or destroy the property. Moreover, those rights can include the right to prevent others from possessing, using, alienating, and/or destroying the property.

An item also can be any tangible personal property that embodies intangible property, such as a book, music recording, video recording, computer program, financial instrument, etc. For example, from a tangible personal property viewpoint, a book can be considered ink attached to several sheets of paper, all of which are surrounded by a paper or cardboard cover. From an intangible property viewpoint, a book can be considered the information conveyed by the pattern of the ink. A purchaser of a book typically obtains full ownership rights in the book's tangible personal property, but few, if any, rights in the intangible property. That is, a purchaser typically obtains the right to possess, use, alienate, and destroy the ink, paper, and cardboard of the book, but no right to copy, alienate, or create derivative works of the information content of the book.

Rights in an item can sometimes be transferred from one rightholder to another. For example, an owner of a tennis racket can sell, lease, lend, give, or bequeath the racket to another person or entity. When sold, given, or bequeathed, all of the rights of the owner can transfer unconditionally or conditionally to the purchaser. When leased or loaned, less than all of the rights of the owner are typically transferred to the recipient. For example, the recipient of the leased or loaned property typically does not have the right to sell or bequeath the property. Moreover, that recipient can be prohibited from releasing or re-loaning the property, or even using the property in any but a proscribed manner.

To enhance clarity, the phrases "first rightholder" and/or "seller" will be used henceforth, however, typically phrases such as "lessor", "licensor", etc. can be substituted without changing the intended scope of the invention disclosed herein. Further, the phrases "second rightholder", "purchaser", and/or "returner" will be used henceforth, however, typically phrases such as "lessee", "licensee", etc. can be substituted without changing the intended scope of the invention disclosed herein.

Frequently, a second rightholder (e.g., purchaser, lessee, etc.) of an item may develop a desire to return the item to the first rightholder (e.g., seller, lessor, etc.). There can be numerous reasons motivating the desire to return the item. For example, a returner can have a change of mind regarding the purchase of the item, and/or can desire to return an item because the item malfunctions or does not meet the returner's expectations. Moreover, the returner may desire to return the item because the item has been recalled, is too difficult to assemble, does not match a particular decor, or duplicates an item the returner already possesses. Further, the returned may find the same item available at a lower price elsewhere, and can therefore desire to return the previously purchased item to recover the price difference.

Thus, there is a strong demand in the market to return items from a second rightholder to a first rightholder. In the retail arena, this strong demand has gradually eroded merchants' resistance to accepting returns, such that most large merchants, and many smaller ones, currently accept returns. This is particularly true around the Christmas season, when the return of gifts becomes a high priority for many consumers. In fact, on average, merchants who sell directly to consumers experience return rates of 25%, with many merchants frequently experiencing return rates above 35%. Moreover, under increasing market pressures, merchants have gradually begun to accept returns at any time, for any reason, and in a few cases, regardless of the condition of the returned item.

Almost all merchants, however, are ill-equipped to handle returns due to poorly designed and/or poorly managed reverse logistics systems. In fact, about 30% of e-commerce companies believe that returns will be their biggest fulfillment challenge in 2001. Typically, a return-accepting merchant stocks a returned item until it can be accounted for, and then attempts to resell the item to a new consumer. If reselling the item is not practical, the merchant attempts to bill the item back to the manufacturer or distributor, who typically requests that the merchant dispose of the item, and who credits the merchant's account with about one half the merchant's cost for the item. Some manufacturers sell items to merchants with a "zero returns" policy. In this case, manufacturers give an up-front discount to merchants and then do not accept any merchandise returns, thereby placing the entire reverse logistics burden on the merchant. This practice has become more popular in recent years for the same reasons that the invention can be beneficial—most manufacturers cannot economically handle returned goods and are not in the business of reverse logistics.

When a merchant (also referred to herein as a "retailer") can not easily resell the item to a consumer, the merchant typically disposes of the item by landfilling, donating the item to charity, or by bulking the item with other items and selling the bulk container by the pound, frequently recovering only a small percentage of the item's cost to the merchant. In fact, on average, bulk disposals net a merchant only 13% of the cost of the item. Moreover, manufacturers and merchants combined lose over $35 billion each year on reverse logistics, much of this on handling consumer returns.

These losses can be broken down further into hard and soft costs. Hard costs for a merchant can include lost revenue from the consumer; lost inventory, shipping (from manufacturer) and handling costs of the original consumer sale; lost package materials costs if not charged to the consumer in original sale (occurring more frequently in eCommerce due to competitiveness of merchants); lost customer service costs; lost processing, accounting, and billing costs if a restocking fee is charged to the consumer or merchant; lost forward logistics costs associated with selling the same item a second time; lost handling, restocking, administration, accounting and, frequently, shipping costs in managing the return; lost financial and operational efficiencies due to frequent inventory disputes and returned item theft; inventory cost increases due to long cycle time before item disposal; lost salvage value due to aging of items during long cycle time; lost cost of packaging returned items for disposal; and/or significant lost value by selling returned items in bulk—many times at cents per pound of item.

Soft costs can include lost brand and market value due to item return issues; lost competitive advantage due to increased cost of sales and related increased sales prices; lost revenue from buyers that would otherwise purchase if item returns policies were more liberal; lost consumer confidence due to fear of needing to return a item; lost revenue due to consumer fear of restocking fees (frequently 15% of retail value); lost revenue because when customers spend money on restocking fees (no margin expense reimbursement), they have less money to buy high-margin items; lost customer satisfaction and confidence due to delayed credits for returned items; lost revenue of gift buying customers due to limited return options for gift recipients; and/or lost lifetime value of customers and reduce customer switching costs due to customer service dissatisfaction and purchase resistance.

For a manufacturer, hard costs can include lost revenue from merchants and rationalize it as a cost of doing business; lost cost of manufacturing items when credit is given to merchants; lost inventory and handling costs of original sale; lost handling, restocking, administration, accounting and, transportation costs if a item is accepted as a return; lost inventory costs due to typical long cycle time before item disposal; lost salvage value due to aging of items during long cycle time; lost cost of packaging returned items for disposal; and/or lost significant value by selling items in bulk—many times at cents for the pound of item. Soft costs can include merchant frustration with item returns; customers' fear of returns which can limit revenue potential (a major reason for consumers to avoid buying on-line, after credit card and privacy fears); and/or customer dissatisfaction that reduces the lifetime value of customers.

Because so little of the costs of returned items are recovered directly by merchants or manufacturers, some of these costs are passed on to consumers in the form of higher prices for purchased items. Thus, returned items currently create substantial losses and costs for manufacturers, merchants, and consumers. Moreover, for those returned items that are not salvageable, society absorbs a substantial cost in the form of reduced landfill space and an increased potential for groundwater pollution.

Thus, managing returns and reverse logistics is a long-standing, large, and growing problem without a known solution.

Method 10

FIG. 1 is a flowchart of an exemplary embodiment of a method 10 of the present invention. As shown at activity 1020, method 10 can include a first rightholder transferring at least possession of (via, e.g., selling, leasing, etc.) an item to a second rightholder. If sold, the first rightholder (seller) can transfer all rights to the second rightholder (purchaser). If leased, the first rightholder (lessor) can transfer the right to possess and use the item to the second rightholder (lessee).

Before, during, or after the transfer of rights in activity 1020, as shown at activity 1040, the first purchaser can take possession of the item. As shown at activity 1060, however, the first purchaser may develop a desire to return the item to the seller. The seller can communicate that the item is to be returned to a bailee. For the purposes of this application, a bailee is an individual or entity who takes possession, but not title, of an item of tangible property in trust for another. Thus, the bailee can serve at least the seller, the returner, and/or both.

As shown at activity 1080, the returner can send or take the item to the bailee, who can take possession of the item. The bailee can receive returned items ("returns") from numerous returners (such as, e.g., end consumers, retailers, distributors, manufacturers, third- or fourth-party logistics entities, etc.). The bailee can have a central returns location or can have numerous distributed returns locations. Moreover, the bailee can receive items at numerous distributed locations and then aggregate the returns at a central location. Further, the bailee can utilize an agent or contractor who has numerous distributed locations to receive returns, and then ship the returns to the bailee's regionalized or centralized returns location. If the bailee is centralized, the returner can personally deliver the item, or, more likely, can send the item via a delivery service such as UPS. Further, the bailee can take possession of the item at a location of the returner's choosing, such as at the returner's home or office. If a return arrives at the bailee that is unexpected, or without including sufficient information to identify a seller and/or purchaser, the bailee can return the item to its sender.

As shown at activity 1100, the bailee can inform the seller and/or returner that the bailee has possession of the item. For example, the bailee can scan a barcode on a shipping label for the item and automatically generate and send an e-mail to the returner indicating that the item was received, and an e-mail to the seller indicating that the item was received from the returner. In another embodiment, the seller and/or returner can be informed via posting on a web page, push technology to a web browser, facsimile, voice-mail, pager, telephone, hard copy letter, or any other well-known method of communication.

As shown at activity 1120, the bailee can obtain return information related to the item. Return information can include a wide assortment of information, including information about the seller, the returner, and/or the item. In one embodiment, at least a portion of the return information can be obtained from a shipping label used to ship the item to the bailee. For example, the shipping label can include a seller code, a returner code, and/or an item code, any of which can be in a numeric and/or barcode format. The bailee can read and/or scan any of these codes and interpret the codes via a database lookup.

For example, based on a seller code, the bailee can obtain an identification of the seller, including contact information for the seller such as the seller's address, telephone number, pager, fax, e-mail address, and/or web page. Moreover, the bailee can obtain a return policy from the seller explaining how the seller wants the bailee to handle various returns. Further, the bailee can obtain return criteria from the seller explaining features to inspect on the item.

Also, the bailee can obtain authorization from the seller to process the return. This authorization can be obtained on an item-by-item basis, or can be a standing authorization. If obtained on an item-by-item basis, the authorization can be provided via, for example, a return authorization provided by the seller at the time of sale of the item to the purchaser. The return authorization can include instructions on how to return the item, an identification (such as a barcode or numeric code) for the item, the seller, and/or the returner, and can include a shipping label addressed to the bailee.

As another example, the return authorization can be provided to the purchaser and/or the bailee as a return authorization number upon the purchaser communicating to the seller a request to return the item and the seller agreeing to that request. As yet another example, the return authorization code and any other needed information regarding returning the item can be provided to the purchaser by the bailee in an e-mail or via traditional mail, along with a thank you for purchasing the item.

By way of similar example, based on a returner code, the bailee can obtain an identification of the returner, including contact information for the returner such as the returner's address, telephone number, pager, fax, e-mail address, and/or web page. Moreover, using information on the shipping label, on a return authorization form, in a return authorization number, and/or via a database lookup, the bailee can also obtain when the item was purchased, where the item was purchased, and the purchase price, as well as the returner's reason(s) for the return.

Utilizing one or more marketing databases, additional information can be obtained about a returner, including for example, geographic, demographic, purchase behavior, return behavior, lifestyle, automobile, household, and/or home data associated with the returner. Also, marketing databases can provide wealth indicators, market segmentation codes, and/or other information related to a returner. The marketing databases can include those of the bailee, the seller, and/or those of third parties, such as the InfoBase, SmartBase, and/or AbiliTec database services provided by Acxiom Corporation of Conway, Ark. Other marketing databases and techniques are disclosed in Acxiom Corporation's Case-in-Point web site (www.acxiom.com/caseinpoint/cip-ix-d.asp), which is incorporated herein by reference in its entirety. The data within such third party databases is typically accessible based on providing a name and address for an individual.

Based on the item code, the bailee also can obtain information regarding the item. This information can be obtained from, for example, a database of the bailee, the seller, a distributor of the item, and/or a manufacturer of the item. In an exemplary embodiment, the bailee can transmit the item code to the seller, who can provide various information about the item, including the item's description, color, style, size, features, limitations, manufacturer, assembler, distributor, supplier, vendor, warranties, photo, lot number, sell by date, recalls, etc.

As shown at activity 1140, the bailee can inspect the item. The inspection of the item can consider criteria, and/or follow a checklist, provided by the seller or developed by the bailee. If provided by the seller, the criteria and/or checklist can be provided in numerous ways. For example, once the seller receives an e-mail identifying the item code of the item being returned, the seller can transmit the criteria and/or checklist. As another example, a seller can provide the criteria and/or checklist on one or more web pages, or in a database, to which the bailee has access.

As shown at activity 1160, upon inspection of the item, the bailee can classify the item into one of numerous categories. Exemplary categories include:

- items that are in original condition
- items that can be sold as new
- items that are undamaged
- items with damaged packaging
- items with damaged and/or missing instructions/paperwork
- items that are damaged
- items that are defective
- items that are non-defective
- items that are functional
- items that are dysfunctional
- items that are nonfunctional In another illustrative example, items can be classified as "A", "B", and "C". Those items classified as "A" items can be those that can be sold as new. Depending on the seller's return policy, "A" items can be returned to the seller or manufacturer, or sold by the bailee.

Those items classified as "B" items can be any items that are imperfect, yet can be re-sold to consumers. Moreover, "B" items can include items that can not be sold as new for legal, item condition, and/or seller reasons. Further, "B" items can include items that have imperfect packaging. These items frequently arise for e-commerce and catalog merchants, because shipping items to homes increases the natural wear-and-tear on the packaging and items. Further, since items cannot be restocked and resold through the mail as economically as they can be in brick-and-mortar stores, there is less incentive for merchants who ship to customers to resell returned items. For example, at least one e-commerce merchant currently donates all of their returned items to charity.

Those items classified as "C" items can be any remaining items that can not be sold to consumers, but can be disposed of through traditional asset recovery methods (e.g., reconditioning, donating to charity, selling as bulk scrap, etc.).

Finally, those items classified as "D" items can be any remaining items which cannot be disposed of through traditional asset recovery methods, but which must be disposed of via such methods as landfilling, incinerating, etc.

Also, as shown at activity 1160, the bailee can place the item in inventory while awaiting sale of the item or fulfillment of a sale of the item. To enable appropriate inventory management, the bailee can attach a "license plate" or identification to the item so that the item's physical location can be more easily tracked.

As shown at activity 1180, the bailee can add value to an item. This value can take the form of replacing missing parts, instructions, and/or other paperwork, re-packaging the item, repairing an item's damaged packaging, or repairing the item itself. Thus, a bailee can enhance an item such that it can be treated, for example, as a "B" item rather than a "C" item. Such enhancement can also occur before the bailee receives the item, by, for example, the bailee assisting the returner by providing specialized packaging for shipping the item to the bailee.

As shown at activity 1200, the bailee can automatically offer the item for sale to a third rightholder (referred to herein as a "new purchaser" and/or "buyer"). An offer for the item can be in the form of an advertisement, and can include item information, such as that obtained in activity 1120.

The item can be sold via any mechanism, including any form of auctioning. To facilitate the sale, the bailee can provide, for example, a web site at which potential buyers can browse available returned items and place bids on those desired. For example, the web site can include a number of pages, each dedicated to, for example, a particular returned item, to any item having a particular item code, to any item from a particular seller, and/or to any item from a particular manufacturer, etc.

Further, such a web site can have a simple membership system and login system. The membership system can capture a profile of the potential buyer, including name, shipping address, phone, fax, pager, e-mail, web site, shipping method, billing address, payment information, etc. The web site can also have a search engine to facilitate detailed searches by, for example, price, item name, item number, item description, item size, item condition, item category, item model, brand name, seller, manufacturer, auction opening date, item minimum bid, auction closing date, and/or item closing price, etc. Also, the web site can have tools to customize viewing options by, for example, any of the search criteria, as well as the ability to automatically generate e-mail notices about items currently and not currently available for bidding. In addition, the web site can provide a help/tutorial system, post-sale service, chat rooms, item feedback forums, and warranty information.

Moreover, the bailee can post a returns policy for returns that are purchased from the bailee. For example, the bailee's return policy can be limited to a warranty that the item is as described. As another example, the bailee's return policy can transfer to the buyer of the returned item the original warranty that provided to the returner. As yet another example, the bailee can offer a buyer an extension of the original manufacturer's warranty, and/or insurance for the item. This warranty and/or insurance can be provided by the bailee, a contractor to the bailee, or an independent third party. As still another example, the bailee's return policy can be more liberal, including, for example, allowing returns at any time, allowing returns in any condition, and/or allowing returns for any reason.

As an example of the inspecting and offering of an item, if a book is returned with a bent cover, a return authorization code entered by the bailee can automatically bring up a picture of the book. The bailee can choose a pre-written description for the condition of the book (i.e. bent cover) from a dynamic inspection criteria specification, or can type in a short description of the condition. Once the bailee submits this information as a "B" Item, an auction web site can automatically show a posting for the book A description of the item, the ISBN number, a starting bid, and the condition of the book can be shown on the page. A picture of the book can also be included on the web page. Technologies such as "agents" or "bots" can be utilized to collect information not in the bailee's database from web sites, such as those of merchants, manufacturers, and auctioneer. If a picture doesn't exist, then a digital camera located on the processing line can be used so that, depending on the item, a picture can be downloaded to the database and posted to the web site.

In another embodiment, once the bailee submits a description of the inspected item, a sales channel optimization engine can determine which auction site(s) or other sales channels are best situated to offer the item for sale. For example, the sales channel optimization engine can utilize both current and historical information regarding this and similar items, including the number of such items in the bailee's inventory, the frequency of returns of such items, and/or recent sales prices for similar and/or related items at each of various sales channels to determine the optimal channel through which to offer each individual item, and/or all items having similar descriptions.

As shown at activity 1220, the bailee can select a buyer for the item and, as shown at activity 1240, can complete the transaction to sell the item to the buyer. This transaction can generate additional information about the buyer, such as, for example, the buyer's identification, address, telephone number, pager, fax, e-mail address, and/or web page. Moreover, based on the information generated in the transaction, additional information can be obtained from one or more marketing databases regarding the buyer, such as that information described above for the returner.

As shown at activity 1260, the bailee can fulfill the transaction and can cause possession of the item to transfer from the bailee to the buyer by, for example, sending the item via a parcel delivery service such as UPS. As shown at activity 1280, the bailee can obtain payment from the buyer, and submit a portion of that payment to the seller, retaining a fee for the bailee's services.

As shown at activity 1300, the bailee can provide return information to at least one stakeholder for an item. A stakeholder for an item can be anyone who is concerned with the item's design, manufacture, distribution, sale, use, maintenance, repair, disposal, and/or any other activity in the item's life cycle. For example, a stakeholder can be the seller, the returner, and/or the buyer, as described above. The stakeholder also can be a manufacturer, assembler, distributor, supplier, vendor, maintainer, repairer, recycler, wholesaler, retailer, and/or merchant of the item. For example, in one embodiment, the bailee can obtain and analyze return information for any number of items, including demographic information for each returner of each item, and provide an aggregated, privacy-protected, demographic profile of returners of the item to the seller. Similar demographic profiles can be provided to the seller for buyers.

As another illustrative example, because the bailee can aggregate returns of any item, regardless of how many different sellers supply the item to purchasers, the bailee can accumulate reasons that a particular item is returned, and provide this information to a manufacturer of the item. Thus, the manufacturer can quickly learn of a design, manufacturing, and/or marketing defect and take actions to alleviate that defect or mitigate its effects. By way of example, rather than waiting for information regarding a manufacturing defect in a woman's sneaker to drift back to the sneaker's manufacturer from a sufficient number of merchants to awaken the manufacturer to the defect, by aggregating returns and return reasons, embodiments of the invention can quickly alert the sneaker's manufacturer to the defect.

As yet another illustrative example, the bailee can identify a pattern of returns by the returner and/or purchases by the buyer. For example, a given individual may return a high percentage of items recently purchased. This can indicate someone who has suddenly experienced a reduced cashflow or sudden need to reduce expenses. Such an individual may become a higher credit risk, which is information that could be of great value to a seller who provides financing to a purchaser.

As still another illustrative example, the bailee can identify a statistically significant pattern of returns by returners and/or purchases by buyers fitting a particular demographic profile. For example, the bailee may notice that males aged 8 to 12 are bidding up the price of returned Nintendo games. Such information can be of substantial value to merchants or the manufacturer of the games.

At some point in method 1, whatever right and/or rights that were held by the second rightholder can be returned to the first rightholder and/or extinguished in the second rightholder. For example, this change of rights can coincide with shipment of the item by the purchaser to the bailee, receipt of the item by the bailee, reporting of receipt of the item by the bailee to the seller, inspection of the item by the bailee, reporting of inspection results for the item by the bailee to the seller, selling of the item by the bailee, and/or shipment by the bailee to the buyer, and/or delivery of the item to the buyer, etc. By way of further example, after the bailee inspects the item and reports to the seller that the item is in condition for sale as an "A" or "B" item, the seller can accept the return, credit the selling price to the purchaser, and re-take full title to the item, with possession remaining in the bailee until the item is re-sold to a buyer. Thus, by reporting return information to the seller, the bailee can facilitate a transfer of the right from the purchaser to the seller.

As mentioned above, at activity 1140, the item can be inspected by the bailee and/or another entity. The results of this inspection can be captured in numerous ways. For example, various perceived characteristics of the item can be described using text, graphics, animation, photographs, audio recordings, and/or video recordings. These descriptions can be contained in or on any appropriate media, including paper, film, magnetic media, electronic media, optical media, and/or any other known media. These descriptions can be stored as analog and/or digital information.

In one illustrative embodiment, the bailee can type a textual description of the item. In another illustrative embodiment, the bailee can narrate a verbal description of the item into an analog or digital audio recorder. In yet another illustrative embodiment, a contractor to the bailee can create a video description of the item using an analog or digital video camera/recorder Similarly, photographic descriptions can be captured using any type of camera. Also, a composite description can be created using any combination of text, graphics, animation, photographs, audio recordings, and/or video recordings.

Moreover, descriptions in one format can be converted to another. For example, a textual description can be converted to a verbal description, using known text-to-speech software. Similarly, a verbal description can be converted to text using known speech recognition software. Likewise, a video description can be segmented into a photographic description, or an audio portion of an audio-video recording can be separated from the video portion, and then converted to text as described above, if desired. Further, a photographic or videographic description can be converted to animation, using known animation software.

Descriptions can be provided by others to the bailee. For example, the first rightholder can provide the bailee with a textual description of the item, the second rightholder can provide the bailee with a photographic description of the item, and the bailee itself can provide an audiotaped verbal description of the item.

Moreover, a description can be joined or linked to another description for the same or a different item. For example, the bailee can link a verbal description of an item to a textual description of the item. In one illustrative embodiment, such a link can be created by providing on a web page the textual information and a hyperlink that when activated automatically plays a digital audio file containing a recording of the verbal description. In another illustrative embodiment, an interactive television screen can provide the textual description, a photograph, and a link that when activated provides a three-dimensional, 360-degree view of the item. In yet another illustrative embodiment, a computer document can provide a photographic description and a link to a recording that provides both a video description and a verbal narrative description of characteristics of the item. In still another illustrative embodiment, a general textual description of any one of group of items can contain a number of links, each link associated with a photographic description of one item in the group. Thus, if the bailee has five books of the same author and title, five links can be formed from a general textual description of the group of books, each link connecting to a corresponding photo for each of the five books.

At step 1200, when the item is offered for sale, the descriptions can be provided to a potential third rightholder, such as, for example, a potential purchaser, lessee, renter, borrower, and/or licensee. The descriptions can also be provided to an actual third rightholder, as well as to any stakeholder, including the first rightholder and/or the second rightholder.

Either upon a received request from the stakeholder, or in some cases automatically, any description can be rendered to the stakeholder. The term "render" can include any act of making the description perceptible to the stakeholder. Accordingly, in one illustrative embodiment, a textual (first) description of the item can be presented on a screen along with another (second) description and/or a hyperlink that, when activated, causes the other (second) description of the item to be rendered.

The quality of the descriptive information provided can be rated by the receiver. For example, a third rightholder who receives or perceives the descriptive information can compare the quality of that information against the third rightholder's own evaluation of the item. The third rightholder can then rate the quality of the information provided.

Under this approach, an identity of an individual who inspects and describes the item can be provided along with the description of the item. For example, an inspector named Alexandra can identify herself in an audiotaped verbal description of an item. Thus, a potential purchaser to whom Alexandra's description(s) are rendered can rate the quality of Alexandra's description(s).

Upon aggregating a number of such ratings, such as by any form of averaging, included weighted averaging, Alexandra may be rated as providing highly accurate item evaluations, particularly for certain types of items. Accordingly, potential or actual stakeholders can place a high degree of confidence in Alexandra's ratings, at least for those types of items for which Alexandra has shown superior inspection and evaluation abilities. Moreover, the bailee can use these stakeholder ratings to evaluate Alexandra's performance and compensate her accordingly.

System 20

Figure 2:
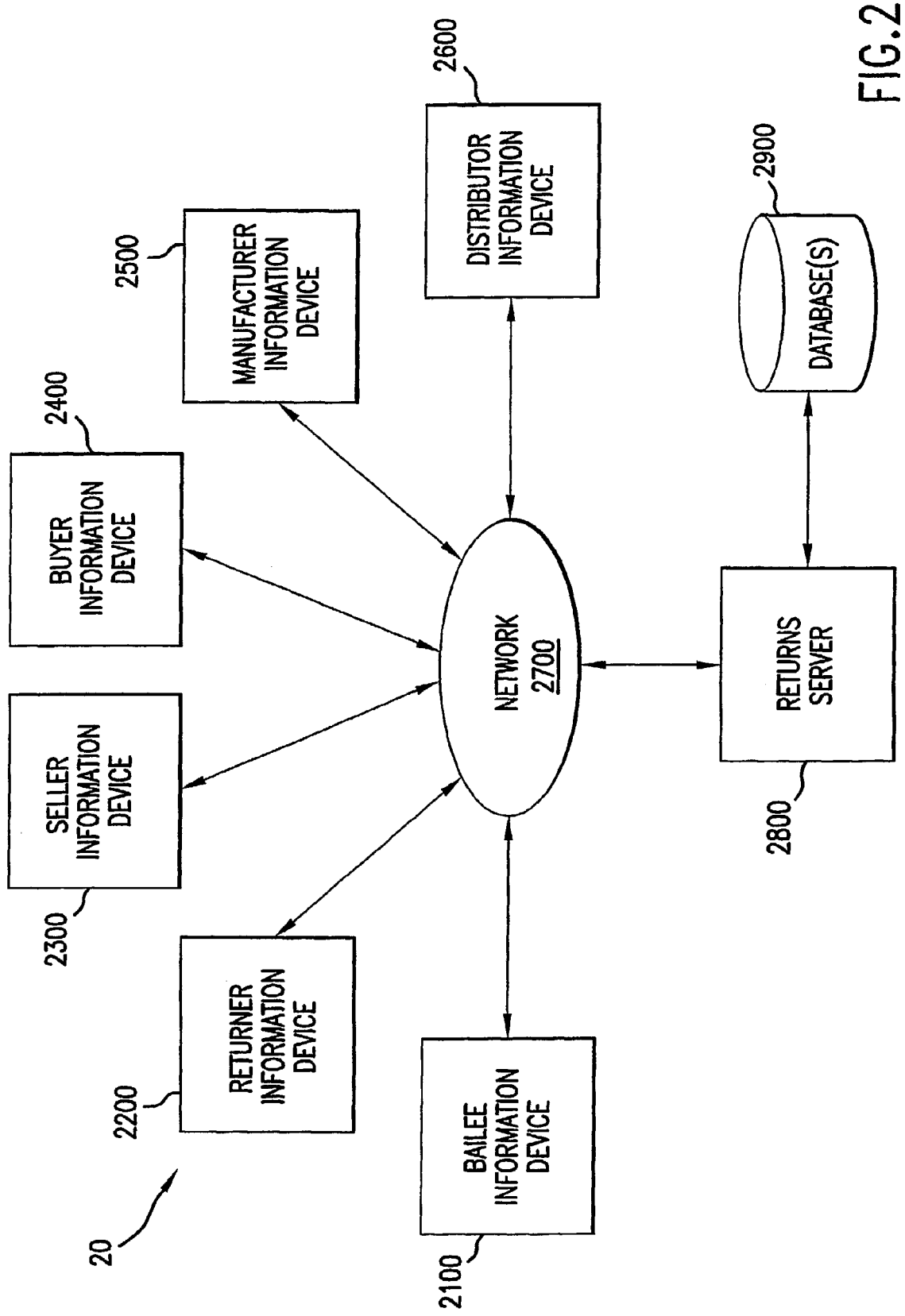
FIG. 2 is a block diagram of an exemplary embodiment of a system 20 of the present invention.

FIG. 2 provides a block diagram of an exemplary embodiment of a system 20 of the present invention. As an initial matter, it suffices to say that, using the description of method 10 and/or method 40, one of ordinary skill in the art can implement the functionality of method 10 and/or method 40 via system 20 utilizing any of a wide variety of well-known architectures, hardware, protocols, and/or software. Thus, the following description of system 20 can be viewed as illustrative, and should not be construed to limit the implementation of method 10 and/or method 40.

Moreover, although depicted primarily as an information system, system 20 can include and/or be included in an item processing system that can also include facilities, tools, hardware, software, and/or personnel, etc., for receiving, staging, inspecting, appraising, storing, packaging, and/or shipping, etc., items.

Within system 20, a bailee information device 2100 can be used by a bailee to communicate regarding one or more items with various stakeholder information devices (e.g., returner information device 2200, seller information device 2300, buyer information device 2400, manufacturer information device 2500, distributor information device 2600, etc.) and with returns server 2800. Bailee information device 2100 can also be used to manage databases, query databases, enter return information for an item, track inventory of items, create advertisements for items, auction items, process purchases of items, charge purchasers, generate return information reports, etc.

Bailee information device 2100 can be connected to network 2700. Also connected to network 2700 can be various stakeholder information devices 2200-2600, which can be used, for example, by a returner to request a return authorization for an item, receive notification that a bailee has received the returned item, receive notification that the returner has been credited for the return of the item, and/or receive return information, etc. As another illustrative example, a stakeholder information device can be used by a seller to host databases, manage databases, receive a return authorization request, to provide a return authorization, to receive notification of receipt of an item by a bailee, to receive a request for item information, to provide item information, to receive notification of payment sent by a bailee that sold an item to a buyer, and/or receive return information, etc. As yet another illustrative example, a stakeholder information device can be used by a buyer to review an advertisement regarding an item, to submit a bid for an item, to receive notification of a successful bid for the item, to provide payment information for the item, and/or to receive return information, etc.

Returns server 2800 also can be connected to network 2700 and can be used to host one or more databases 2900, serve files, serve e-mail, etc. Returns server can be a computing device of any sort. Similarly, any of information devices 2100-2600 can be used to host one or more databases (not shown).

Network 2700 can electronically link physically distant information devices 2100-2600, and returns server 2800, so that information can be transmitted and/or exchanged there between. Network 2700 can have any architecture, including a direct connection, a local area network, a wide area network such as the public switched telephone network and/or the Internet, an extranet, and/or a combination thereof. Network 2700 can be a packet-switched, a circuit-switched, a connectionless, or connection-oriented network or interconnected networks, or any combination thereof. Network 2700 can be oriented toward voice, data, or voice and data communications. Moreover, a transmission media of network 2700 can take any form, including wireline, satellite, wireless, or a combination thereof.

From a hardware standpoint, any information device, including bailee information device 2100 and/or any stakeholder information device 2200-2600, can be, for example, a landline or wireless telephone, facsimile, personal computer, personal information manager, personal digital assistant, handheld computer, data terminal, or other similar device.

Information Device 3100

Figure 3:
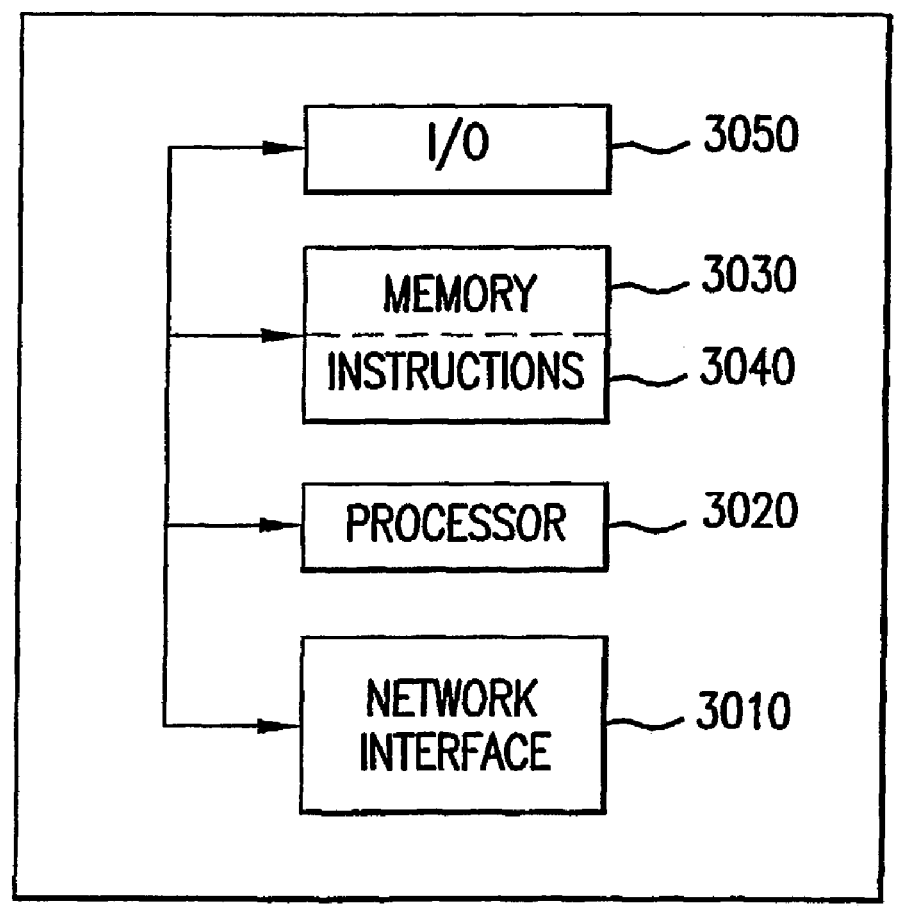
FIG. 3 is a block diagram of an exemplary embodiment of an information device 30 of the present invention.

FIG. 3 is a block diagram of a typical exemplary information device 3100, which can symbolize bailee information device 2100, any stakeholder information device 2200-2600, and/or returns server 2800. Information device 3100 can include well-known components such as one or more processors 3120, one or more memories 3140 containing instructions 3160, one or more input/output (I/O) devices 3180, and one or more network interfaces 3190.

In one embodiment, each processor 3120 can be a general purpose microprocessor, such a the Pentium series microprocessor manufactured by the Intel Corporation of Santa Clara, Calif. In another embodiment, the processor can be an Application Specific Integrated Circuit (ASIC) which has been designed to implement in its hardware and/or firmware at least a part of a method in accordance with an embodiment of the present invention.

Any memory 3140 can be coupled to a processor 3120 and can store instructions 3160 adapted to be executed by processor 3120 according to one or more actions and/or activities of a method described herein. Memory 3140 can be any device capable of storing analog or digital information, such as a hard disk, Random Access Memory (AM), Read Only Memory (ROM), flash memory, a compact disk, a magnetic tape, a floppy disk, and any combination thereof.

Instructions 3160 can be embodied in software, which can take any of numerous forms that are well-known in the art. For example, system 20 can utilize one or more databases having a flat file or a relational organization, and a centralized or distributed architecture. For instance, those of skill in the art can tailor items such as an SQL database to provide the functionality of method 10 and system 20. One supplier of such database items is Oracle Corporation, of Redwood Shores, Calif. Moreover, software tools such as EDI, FTP, HTTP, HTML, XML, cXML, XSL, and WAP can be utilized for communications between information devices. Additionally, system 20 can utilize platform-independent and/or network-centric software tools such as, for example, Java or JavaScript. Furthermore, system 20 can utilize auction site development and maintenance tools such as LiveExchange from Moai of San Francisco, and Mountain View, Calif. (http://www.moai.com), warehouse management system (WMS) software such as WarehousePRO from Logility Inc. of Atlanta, Ga. (http://logility.com), and/or networking software such as Community from Thundercloud Networks of Cambridge, Mass. (http://www.thundercloudnetworks.com).

Any input/output (I/O) device 3180 can be an audio and/or visual device, including, for example, a monitor, display, keyboard, keypad, touchpad, pointing device, microphone, speaker, video camera, camera, scanner, and/or printer, including a port to which an I/O device can be attached or connected.

Any network interface 3190 can be a telephone, a traditional data modem, a fax modem, a cable modem, a digital subscriber line interface, a bridge, a hub, a router, or other similar devices.

For more details regarding embodiments of method 1, system 2, and device 3, the reader is referred to the provisional application titled "System and Method for Managing Returned Goods", Ser. No. 60/181,931, filed Feb. 11, 2000, and to a provisional application, titled "System and Method for Managing Returned Goods—Part 2", Ser. No. 60/185,713, filed Feb. 29, 2000, each of which is incorporated by reference herein in its entirety. More specifically, the reader is referred to those portions of each of the above described provisional applications titled "IVY Logical IT Architecture" and the following eleven pages of flowcharts, as well as those portions titled "IvyVentures.com Process Narratives" and "Process Steps for Ivy Ventures".

There are substantial advantages of the methods and systems of the present invention over the known methods and systems. Comparing embodiments of the present versus traditional reverse logistics methods, numerous differences and advantages are apparent. For example, returns are traditionally randomly agglomerated into large bulk packages and sold by the pound. Embodiments of the present invention, however, allow each returned item to be offered and sold individually, at that item's market price, and thereby delivered to the buyer as a parcel.

Moreover, embodiments of the present invention can shift the costs of consumer returns from merchants and manufacturers to other consumers that are willing to pay for the remaining value in the returned goods. This can create a win-win-win situation for merchants, manufacturers, and consumers.

For merchants, embodiments of the present invention provide a novel and inventive process by which returned goods can be sold directly to consumers through a business-to-consumer auction site. Thus, embodiments of the present invention can allow a maximum value to be set for items as early as possible in the life of a item. The auction mentality can even provide the opportunity to sell consumer returns above market values. Additionally, embodiments of the present invention can improve cash flow for the merchant due to sales and can reduce inventory levels, minimize transaction costs, and provide data tracking services that can help reduce returns. These data tracking services can also allow merchants to identify consumers who abuse returns policies, identify items that a high return rate, and clearly delineate the costs of returns. Moreover, embodiments of the present invention can remove merchants from the business of managing returns, which can help them focus on customer service and selling, Further, embodiments of the present invention can enable merchants to loosen their returns policies, which can thereby reduce customer buying resistance and switching of merchants. In addition, by utilizing independent and trained third party experts, embodiments of the present invention can bring a higher level of objectivity to the handling of returns.

For manufacturers, embodiments of the present invention can allow the recovery of a much higher portion of the costs of items. Unlike known processes, embodiments of the present invention can allow a maximum value to be set for an item as early as possible in the life of the item. The auction mentality can even provide the opportunity to sell consumer returns above market values. Thus, embodiments of the present invention can improve cash flow due to sales, lower the total cost of sales, and reduce inventory levels. Embodiments of the present invention can enable these cash flow and cost advantages by allowing consumers to share the costs of returns, instead of sharing these costs only between merchants and manufacturers. In addition, by utilizing independent and trained third party experts, embodiments of the present invention can bring a higher level of objectivity to the handling of returns. Further, embodiments of the present invention can provide improved returns tracking services that can help manufacturers quickly spot design, manufacturing, and/or marketing defects, the alleviation of which can reduce returns and improve consumer and merchant goodwill. Moreover, by providing an efficient method for reselling returns, embodiments of the present invention can create societal goodwill by lessening the amount of returned items disposed of by landfilling.

For consumers, embodiments of the present invention can provide access to nearly-new items without the retail price tag, and can thus enable the purchase of better quality items than current auction sites. Moreover, embodiments of the present invention can provide a better mix of experience, price, quality, and selection than shopping at traditional bricks-and-mortar or Internet "off-price" merchants. Also, embodiments of the present invention can provide reduce consumer fears by providing secure shopping, by offering a liberal returns policy, and by providing a reputable vendor from who to purchase. Thus, for purchasers, embodiments of the present invention can make catalog and on-line shopping more appealing, because the hassle of returns is minimized. Further, for buyers embodiments of the present invention can provide the convenience of web-based shopping, including shopping baskets and gift deliveries.

Further advantages for consumers can include obtaining more and richer descriptive information about an item that what is traditionally available, particularly from catalog and on-line vendors. Moreover, because the descriptive information can include an indicator of its provider, the consumer can ascertain what degree of trust to place in that descriptive information.

Additional Embodiments

Optimization Engine

As described above, an embodiment of a system and/or method of the present invention can include a sales channel optimization engine that can determine which sales channel(s) are best situated to offer an item for sale. Thus, the optimization engine can be viewed as an automated process that can maximize and/or optimize an item processing system's profit on the sale of items, in some cases regardless of what those items are or the condition that they are in. For each item that is processed by such a system, the optimization engine can find the "channel" or place of sale where the revenue and/or profit earned on the sale of that item is the highest.

To better understand various embodiments of the optimization engine, consider the workings of an optimization engine that sells one item at a time. This particular optimization engine can be visualized as having four components:

1. The ability to find and then define the set of "variables" of the item that has intrinsic worth to customers, that is, those variables (and their corresponding values) for which potential purchasers tend to be willing to pay;
2. The ability to determine, for most (if not all) possible combinations of that item's variables and/or values, the "channel" (and/or set of buyers) that yields the optimal profit on a sale of that item;
3. The ability to obtain knowledge of the costs involved in uncovering the values associated with each of the item's variables, describing the values of the item, offering the item for sale, selling the item, handling the item, storing the item, and/or delivering the item to the purchaser; and
4. The ability to learn how variables (and the values associated with variables), costs, revenues, and/or profits change over time.

Thus, in some scenarios, it can be important to know why certain items tend to sell for more or less than similar items. Items with better variable values (characteristics) tend to command higher market value. For example, prior to the actual sale, we could expect that a computer with a 1 GHz Pentium processor will sell for more money than a computer with a 500 MHz Pentium processor, all else held equal. Of course, on any given day, because of thin markets, etc., a computer with a 500 MHz processor may sell for a higher price than one with a 1 GHz processor, all else held equal. But prior to the actual sale we expect that a computer with a 1 GHz processor will command a higher price than the 500 MHz computer.

A different example involves a "Barbie doll". Apparently, a Barbie doll without a box can command 50% less than the doll with its box. So, according to these examples, processor speed and condition of box are variables that command worth for their respective items. Conversely, processor speed is an variable that does not typically apply to Barbie dolls, whereas computer shoppers might not financially appreciate the condition of the computer's packaging.

Knowledge of the item's variables and/or values can aid the optimization engine in choosing the appropriate sales channel, which can be the channel that yields the maximum selling price and/or profit. In many cases the highest profit is realized by selling at the highest price. To determine the channel having the highest expected selling price, the optimization engine can calculate the expected price of a item (with given variables and/or values) for all appropriate channels and then choose the channel yielding the highest expected price.

To do so, the optimization engine can determine appropriate channels. Such channel determinations can include:

(a) Should the item be sold or thrown out?
(b) If the item should be sold, should the item be:
  i. auctioned,
  ii. sold to a liquidator,
  iii. refurbished,
  iv. or, given to charity?
(c) If the item should be auctioned,
  i. Which auction site should be used: eBay, Yahoo!, some other 3rd party site, or the item processing system's own site?
  ii. How should the title and description of the item be worded?
  iii. How should the auction be designed (e.g., reserve, length of time, etc.)

Additional questions can be envisioned in the determination of appropriate channels to consider. For example, depending on one's view the world, it might be possible to argue that there are a nearly infinite number of channels. For example, it might be possible that a three-day auction can be viewed as a different "channel" than a two-day auction (because it might reach a different market and/or set of potential buyers). Another viewpoint suggests that each channel comprises one or more channel variables, such as "auction site", each of which have a plurality of channel values, such as eBay and Yahoo!, associated therewith.

As another example, and continuing with the computers and dolls theme, on average it might be more profitable to auction computers on eBay, but dolls might tend to sell for higher prices and/or profits on Amazon. Similarly, it might be better to auction desktop computers with a low or zero reserve, while it might be advantageous to auction dolls with a reserve that is a substantial fraction of retail worth. Knowledge of the item's significant channel-based variables could also help in other ways. For instance, there might be "day of week" effects that vary based on the item or its variables, or, the best title might vary depending on each item's condition. For example NIB, meaning "New In Box," is a word common to many eBay titles and tends to add worth.

Once the variables that have market worth are known, and the maximum expected revenue and/or profit for any valuable set of variables for an item is known, then the optimization engine can guide the value analyst to look for and/or disregard certain variables during the inspection process. For certain items (such as items that arrive in bulk without a box), inspection might be costly. For example, it might take the value analyst a nontrivial amount of time—say 15 minutes—to determine the size of a computer's hard drive. If the value analyst's total wage (including all benefits, etc.) is $20 per hour, then the computer inspection costs $5 of the value analyst's time. Assuming the system keeps 10% of the revenue of any given sale, the inspection process must uncover an additional $50 of benefit to be profitable. Thus, for this example, if identifying hard drive size is not likely to provide at least an additional $50 in profit to the item processing system, then inspection of hard disk size should not be undertaken.

Therefore, the optimization engine can perform a cost-benefit analysis for all items, prior to inspection, to determine whether it is profitable to search for and/or identify the variables and/or values that have been determined to add benefit.

As a complement to knowledge of the benefit-adding variables and/or values, knowledge of the costs associated with each item can be helpful to the cost-benefit analysis. Such associated costs can include the costs of processing each particular item, such as for example, the costs associated with inspecting, describing, offering for sale, handling, storing, insuring, selling, packaging, shipping, delivering, and/or servicing the item. The associated costs can also include other costs, such as for example, the cost of obtaining and/or managing cost and/or benefit data, the cost of the customer service time spent answering questions, and the processing of any (unanticipated) returns, should a purchased item be returned to the system. These costs can be assigned to those items for which they are incurred, and/or can be allocated across item categories, families, and/or all items.

Finally, the optimization engine can be constantly updating and learning about the variables that bring benefit and the costs to obtain that benefit. This learning can take place in at least three ways.

First, a "snapshot" of data can be collected from all available channels on a periodic (e.g., weekly, daily, and/or hourly, etc.) and/or aperiodic basis. Analysis of historical data, possibly in combination with this snapshot data, can reveal trends in the marketplace. Knowledge of these trends can allow for more accurate channel selection. For example, eBay might currently be the best place to auction Barbie dolls, but Yahoo! auctions might be trending toward displacing eBay as the preeminent Barbie doll site. Snapshot data on the volume of items sold (and items offered for sale) on eBay and Yahoo! might show this trend as it is occurring, thus allowing a continuous real-time improvement of the optimal channel decision made by the optimization engine. The snapshot data can also aid in assessing how the set of variables (and the value of each variable) are changing over time.

Processor speed is an example of a variable having an associated value that can have a changing worth and/or benefit. A used personal computer having a 1 gigahertz processor might currently have a substantial amount of worth in the market, but in two years this same computer might be almost worthless. The benefit the optimization engine associates with a processor speed value of "1 gigahertz" thus can adjust in a timely fashion to reflect the ongoing changes in market conditions and/or valuation.

Second, historical data can be used to help measure the item processing system's costs of bringing items to market. As discussed above, some of these costs can include costs associated with inspecting, describing, offering for sale, handling, storing, insuring, selling, packaging, shipping, delivering, and/or servicing the item. The system's data collection procedures can record the costs (time and otherwise) associated with the sale of each item, and with managing the process generally. For items that the system has sold previously, the system can directly use the historical costs recorded in the system's database to estimate current costs. For items that the system has not yet sold, the system can use average historical "item category" costs as a preliminary estimate of the system's costs of bringing the new items to market. Once the system has sold a particular item, the system's database can be updated, and the system can have a more precise estimate of the system's costs of processing going forward.

Third, ongoing "experiments" can be performed on a periodic and/or aperiodic basis. In these experiments, deliberately and/or randomly chosen items can be sold on channels that might not be expected to be "optimal." For example, in one of these experiments a computer can be sold on Yahoo!, even though the optimization engine predicts that its best place of sale is on eBay. Or, a low reserve price can be set on a Barbie doll, even though (hypothetically speaking) the optimization engine predicts that a high reserve price on Barbie dolls brings maximum revenue. All values associated with the optimization engine, such as for example, which channel to choose, what words to place in the title and description, and/or the length of an auction (if auctioned), etc., can be tested during these "experiments." Likewise, any other values considered by the optimization engine can be tested. Since the optimization engine can be designed to always yield, for example, the maximal profit, most of these experiments are likely to yield less profit than if an experiment had not occurred. However, if an experiment yields a significant increase in profit over expected profit, then that experiment can influence the optimization engine's future determinations and/or selections.

Another method of improving the optimization engine's determinations involves randomization. The use of randomization to find the "maximum" of a function with unknown curvature has a long history in econometrics. Thus, formal maximization algorithms involving randomization, such as "simulated annealing," can be applied to improve the function of the optimization engine.

The optimization engine can be more sophisticated than discussed so far since the item processing system the optimization engine can serve is capable of processing a nearly unlimited number of items each day, and easily upwards of tens of thousands of items per day. To meet this load, the optimization engine also can perform the following tasks:

(5) Calculate how best to group (or not group) the items; and (6) Forecast future shipments of items.

Concerning task (5), optimally selling groups of items can be more complicated then optimally selling only one item for at least two reasons. First, the number of possible combinations of items that can be sold is large. For example, if the item processing system receives n items to sell, the system can sell n individually, n−2 individually and 1 group of 2 bundled items, etc. By way of further example, suppose that in any given day, the item processing system receives 1000 computers and 1000 Barbie dolls to sell. The system can sell each of the 1000 Barbie dolls and computers separately; the system can sell 800 computers bundled together, 700 Barbie dolls bundled together, and 200 and 300 computers and dolls separately; or, the system can sell 1000 bundles of 1 Barbie doll and 1 computer, as well as numerous other combinations. With multiple simultaneous items to bundle and/or sell, the number of optimization engine calculations can increase quite a bit because the number of possible combinations of items can increase geometrically.

Second, calculation of the optimal channel for a given bundle of items can be complicated because the price the item processing system expects to earn on any particular channel might be influenced by the system's supply of items to that channel. Intuitively, selling a large group of identical items on a given channel—when the channel has not historically seen that many identical items at once—might "flood" that channel. For example, 100 desktop Pentium III computers might typically be sold on eBay in a given week. If the system tries to sell 1000 such computers on eBay over a three day period, then the clearing price of these computers is likely to be lower than the average eBay selling price of these computers. So, in addition to its other tasks, the optimization engine can form forecasts of how the supply of items to a given channel might alter the market price of identical and/or similar items for sale on that channel. Likewise, per item inspection costs might greatly increase if a flood of computers must be processed within an unusually short period of time.

Finally, task (6) (forecast future shipments) can be viewed as related to task (5) (how best to group or not group items). The item processing system's decision to process and/or sell similar items in "bulk" or piece-by-piece over a number of weeks (and possibly through a number of different channels) can depend on the system's forecasts of future shipments of items to the system. For example, suppose the item processing system receives a shipment of 1,000 computers from Egghead. If the system has historically processed weekly shipments of only 100 computers from Egghead and forecasts future weekly shipments of 100 computers, then the system might be best served by processing and selling the 1000 computers from the current shipment in bulk, rather than individually. In contrast, if the item processing system does not expect any more computer shipments from Egghead for a while, then the system might be able to spread the processing and/or sale of 1,000 computers out over a number of weeks if that strategy yields the maximum amount of revenue and/or profit.

Similarly, the optimization engine can benefit from forecasts of future shipments to perform "risk management" on the item processing system's warehouse. If the system's warehouse is nearly full, knowledge of future shipments can be beneficial to determining the way in which the system sells any current inventory. For example, suppose the system's warehouse is nearly full and the system receives a shipment of 1,000 low-benefit Barbie dolls. If the system expects to receive a shipment of 200 high-benefit computers, and the space required by the 200 computers is the same as the 1,000 dolls, the system can bulk-sell the system's current dolls to leave space for the 200 computers that the system can try to sell individually.

Related to this, the optimization engine can use the item processing system's warehouse to exploit weekly or seasonal patterns in sales. Thus, if the system's warehouse is not nearly full, then the system can store certain items for a number of days, weeks, or months to try to exploit expected weekly, monthly, or seasonal surges in sales. For example, consumers might be willing to pay a premium to purchase computers prior to Christmas, when demand is typically very high. Assuming it is most profitable to do so, the system can store computers in the system's warehouse in November and early December to unload all of the computers on eBay (or through another channel) prior to Christmas.

Thus, the optimization engine can be viewed as a process that can maximize the item processing system's profits, in the short-term and/or long-term. To do so, the optimization engine can evaluate (a) what the system currently has for sale, (b) what the system expects to receive to process and/or sell, (c) the state of the system's warehouse, (d) the system's current and historical expected costs of bringing items to market, and, (e) current and historical conditions on each possible channel to determine (i) the optimal sales channel appropriate for each item or set of items the system receives, (ii) the variables of each item that have benefit and thus should be the focus of inspection by the value analysts, and (iii) the optimal amount of inspection time performed by the value analysts. The optimization engine process can change over time due to (1) the use and analysis of current and historical snapshots of market data, (2) analysis of the system's historical costs of bringing items to market, and (3) channel "experiments" performed on at least a fraction of the items the system sells.

Method 40

Figure 4:
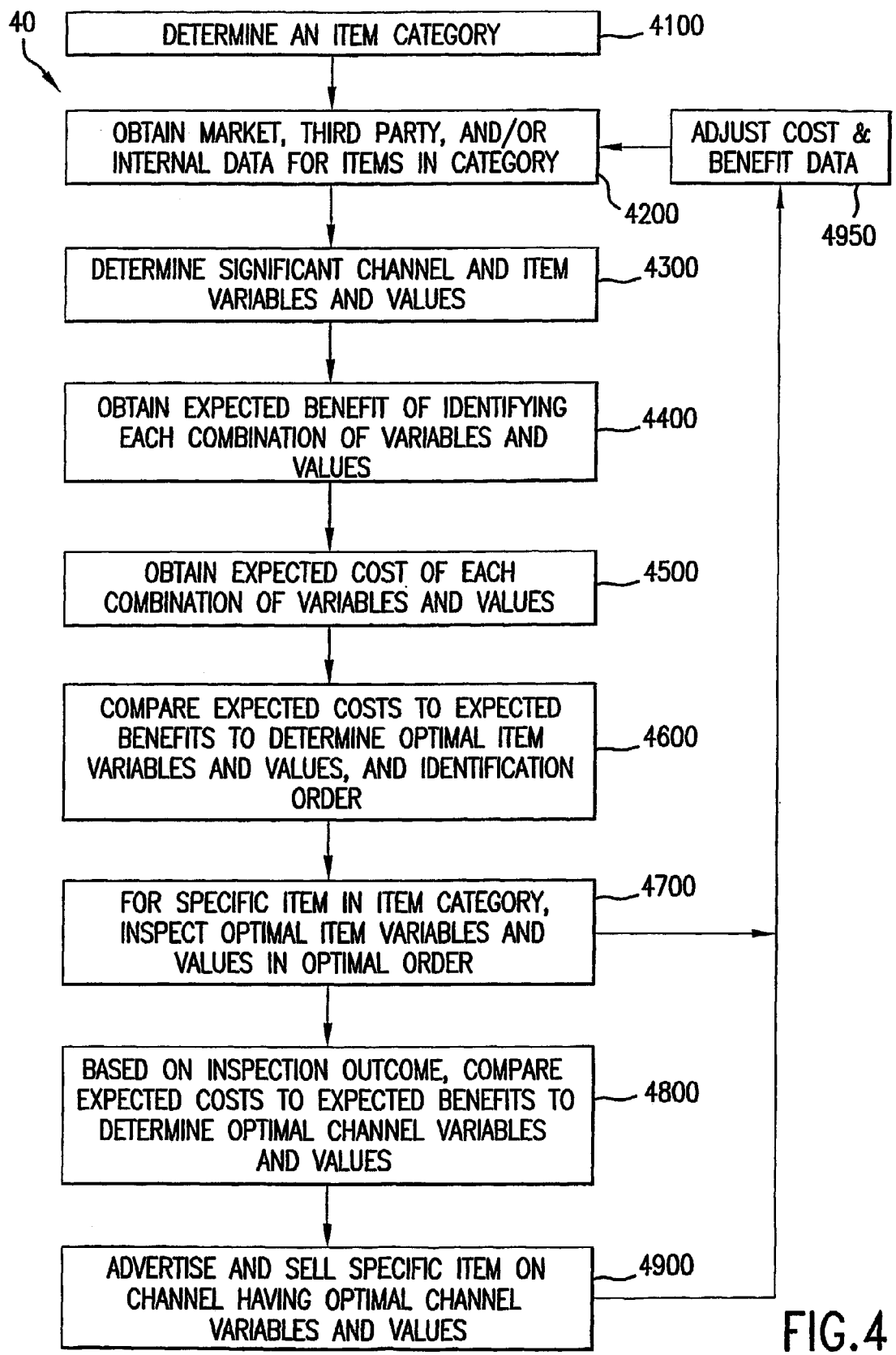
FIG. 4 is a flowchart of an exemplary embodiment of a method 40 of the present invention.

FIG. 4 is a flowchart of an exemplary embodiment of a method 40 of the present invention, which incorporates at least some of the activities of the optimization engine. Method 40 can be implemented on any information device 3100, including for example, bailee information device 2100 and/or returns server 2800.

Referring to FIG. 4, at activity 4100 an item category can be determined or chosen. For example, an item category could be personal computers or dolls. The item category can be chosen randomly or purposefully. Moreover, the item category can be determined from item categories found, for example, on major on-line auction sites. Further, an item category can be viewed as characterizing a set of auctioned, sold, and/or purchased items that share at least one variable value.

At activity 4200, market, third party, and/or internal data for items in the item category can be obtained. This data can be obtained from a database containing data for items from many different item categories. This data can include current and/or historical data, including channels, costs, prices, quantities, descriptions, conditions, and/or terms, etc., for items associated with the item category. Cost data can include, for example, any costs related to handling, inspection, appraisal, description, customer service, storage, packing, shipping, returns processing, and/or data storage, etc. Channel data can include, for example, data associated with channels such as liquidators, returns retail stores, etc., and/or other well known channels for selling returned, used, and/or surplus items. Such data can further include, for example, posting, bidding patterns, selling patterns, shipping terms, returns policies, inventory constraints, and/or channel flooding information, etc.

As another example, associated with the personal computer item category could be data that includes, for each of several channels, selling prices and descriptions under which the items were sold. For channels that involve auctions, the data could also include auction design data, such as auction length, minimum bid requirements, etc.

At activity 4300, based on the obtained data, significant channel and item variables and/or values for items in the item category can be determined. For example, significant item variables for personal computers could be manufacturer, processor type, processor speed, hard disk size, RAM amount, etc.. For the manufacturer variable, significant values could be: Compaq, HP, Dell, and Gateway. For the hard disk size variable, significant values could be: less than 2 gigabytes and greater than or equal to 2 gigabytes. For the RAM amount variable, significant values could be: 16 megabytes, 32 megabytes, 64 megabytes, 128 megabytes, and 256 megabytes. Other potential item variables could include: model; desktop vs. laptop; CD speed; modem speed; video card resolution; length of time since manufacture; length of time since sold to first customer; original retail price; current new price at sample e-tailer and/or store; dimensions (height, weight, and depth); color; does it work?; manuals included?; included software; installed software; scratched, dented, or cosmetically altered; and/or "value analyst's subjective ranking (1 to 10 scale)"; etc.

Continuing with this example, for personal computers a significant channel variable could be "auction?" and/or "auction sites". Significant values associated with the auction sites variable could include: eBay, Yahoo!, and/or system (signifying an auction held on the system's auction site). Another significant channel variable could be "Liquidators?". Other significant channel variables could include auction length, auction reserve, photo annotation, voice annotation, video annotation, analyst identification, etc. Yet other significant channel variables could include the significant (and/or other) item variables. Further, significant channel values could include the significant (and/or other) item values.

A determination of which variables and/or values are "significant" can reflect those statistically significant results of a statistical analysis performed upon the database. For example, certain words in the descriptions of items advertised on web-based auction sites can be analyzed against the selling prices of those items using linear regression analysis. The variables of that analysis could correspond to the words in the textual portion of the descriptions. The coefficients of that analysis could correspond to the correlation of the presence of the words to the selling price.

Prior to the regression analysis, the textual descriptions of each item in the item category can be concatenated, and a frequency count of each word in the concatenated description can be performed. Articles such as the words "a", "an", "the", etc., and other pre-identified words of little and/or no significance can be eliminated from the frequency count to arrive at a ranked list of words. All of the remaining words, those words having a frequency above a pre-determined threshold, and/or certain pre-determined words, can be characterized as "keywords". These keywords can then be subjected to the linear regression analysis. As a variant on this process, certain pre-determined combinations of words (i.e., phrases), can be processed instead of or in addition to individual words alone.

Thus, for example, a keyword analyis of advertised descriptions of personal computers could indicate, for example, that Dell, Intel, 20 gigabytes, and 256 megabytes are words/phrases that, when they appear in those descriptions, have a high statistical likelihood of corresponding to higher than average selling prices, and thus are significant values.

Alternatively, based on prior knowledge and/or estimates that variables such as manufacturer, processor type, processor speed, hard disk size, RAM amount, etc. are likely to be significant (e.g., correlated with higher selling prices), this information can be confirmed by regressing the selling prices against these known and/or likely variables and/or their values, which can be manifested as their associated keywords. If the regression coefficients for any variable and/or value turn out to be substantially lower than expected, that variable and/or value can be ignored and/or removed from the analysis. In yet another alternative, determining which variables and/or values are "significant" can be based solely on prior knowledge and/or estimates.

Additional significant variables and/or values also can be determined from the obtained data. For example, significant inventory variables can include: seasonal item, best selling season, worst selling season, cost of carrying, available storage space, storage location, quantity in storage, expected inflows, expected outflows, etc. As another example, for returns of items previously sold by the item processing system, significant returns variables can include: likelihood of return, cause of return, cost to re-inspect, cost to refurbish, cost to dispose, warranty policy, etc.

At activity 4400, an expected benefit of identifying each combination of significant variables and/or values can be obtained, for example, from the data obtained in activity 4200. A benefit can be, for example, a selling price, a profit, an incremental profit, etc. An expected benefit can be a statistically determined benefit, such as an average, a mode, etc. Thus, for example, an average incremental profit associated with inspecting and advertising hard disk size for a personal computer can be identified from data associated with the personal computer category.

As activity 4500, an expected cost associated with identifying each combination of significant variables and/or values can be obtained, for example, from the data obtained in activity 4200. A cost can be an inspection cost, a handling cost, etc., and can be an aggregate and/or an incremental cost. An expected cost can be a statistically determined cost, such as an average, a mode, etc.. Thus, for example, an average incremental cost associated with inspecting hard disk size, once the manufacturer is known for a personal computer, can be identified from data associated with the personal computer category.

For items in the item category, at activity 4600, expected costs can be compared to expected benefits to determine optimal item variables and values, and an optimal inspection order. For example, the cost of inspection of a variable might be substantial and, thus, when compared to the benefit associated with that variable, can dictate whether the variable's value should be uncovered or not. By way of further example, contributors to the potentially substantial costs of inspection can include physical labor time, use of specific required tools for inspection, cost of acquiring data sets, computing and server time, labor down-time (if waiting on search results), opportunity costs, etc.

Moreover, the inspection cost for identifying a variable's value also might be either independent of or dependent upon the inspection of other variables. For example, the cost of measuring the amount of RAM loaded in a laptop computer might be independent of identifying the computer's manufacturer. In another example, however, once the laptop computer has been started, and its processor speed has been determined, there may be only a small additional cost to determine the computer's hard drive size versus if only hard drive size alone was inspected upon start-up. Thus, the cost of inspecting a variable can depend upon where one is in the inspection process and/or what has been inspected beforehand. Therefore, the optimization engine can identify the expected benefit-maximizing order of inspection and/or the optimal order of inspection.

Thus, prior to actually inspecting any specific item, data associated with that item's category can be analyzed to determine optimal item variables and/or values to inspect, and an optimal order in which to do so. With this information in hand, any specific item in the item category can be optimally inspected. Thus, at activity 4700, the previously determined optimal item variables for a specific item can be inspected in their optimal order to identify the specific item's corresponding values.

At activity 4800, based on the inspection outcome, that is, the identified values corresponding to the optimal variables, expected costs and expected benefits associated with various channel variables and/or values can be compared to determine optimal channel variables and/or values. Thus, for example, knowing that a specific computer has an Intel Pentium processor and a 500 megabyte hard disk, the cost-benefit determined optimal channel values might be: auction, eBay, 3 day, no reserve, minimal description, without photo or voice annotation, no value analyst identification, no warranty, etc..

At activity 4900, based on the optimal channel variables and/or values, the specific item can be advertised and sold.

At activity 4950, cost and/or benefit data gathered during, for example, activities 4700 and/or 4900, can be fed back to the database populated during activity 4200. For example, when a specific item is sold, information can be gathered and/or stored, such as, for example, information related to the specific item's total cost, inspection cost, inventory cost, handling cost, insuring cost, packaging cost, shipping cost, bid history (if any), bidder information (including name, address, e-mail address, and/or demographic information, etc.), selling price, selling date, selling time, purchaser, method of payment, method of shipping, and/or shipping address, etc. In some circumstances, information associated with a specific item can be aggregated across some and/or all items having similar values for certain variables. Moreover, such information can be statistically analyzed to detect, for example, averages, standard deviations, correlations, and/or trends, etc..

Because this information can be generated within the item processing system and/or the optimization engine process for a specific item, this information can be considered as internal data.

AN EXAMPLE

To assist with the understanding of some of the activities of method 40, a more detailed example is now provided. FIG. 5 contains tables highlighting exemplary statistics and expected benefits that could be obtained from textual and/or keyword analysis of sold item descriptions, linear regression techniques, prior knowledge, and/or various outside sources, as previously described for activities 4200 through 4400 of FIG. 4. In the example of FIG. 5, it has been determined through some and/or all of these techniques that two variables of a computer can command statistically significant market worth—the processor type, and the size of the hard drive. In reality, buyers might also appreciate other variables. Moreover, in reality, buyer might differently appreciate Intel Celeron chips versus Intel Pentium III chips versus AMD Athlon chips etc. Similarly, they might differently appreciate 1 GB, 2 GB, 3 GB, and 4 GB hard drives. However, for the purposes of this example—which is intentionally kept simple for clarity of exposition—it is assumed that buyers only care whether or not the processor is Intel or not and whether or not the hard drive size is greater than or equal to 2 GB.

FIG. 5 includes several exemplary probability tables, including an example of a "joint probability" table that could be returned at activity 4200 and/or 4300. Each cell in this table represents the probability that a particular combination of processor speed and hard drive size occurs in a computer that might be and/or has been received by the item processing system. For example, the top left cell of this table is the probability (0.40) that a computer to be processed will contain an Intel processor and a hard drive size greater than or equal to 2 GB in size.

Notice that the probabilities in both the rows and the columns of the joint probability table sum to 1.0. This is because of the assumption that all computers have either Intel or Not Intel (called "Budget") processors and have either a hard drive size less than ("<") 2 GB or greater than or equal to (">=") 2 GB. Thus, this table lists the exhaustive set of possibilities for the two variables of computers and the probabilities therefore should sum to 1.0.

Based on the data in the joint probability table, "marginal" and "conditional" probabilities of the values for the processor and hard disk size variables can be calculated. The "marginal" probability of an Intel chip is the probability the computer has an Intel chip regardless of the hard drive size. This probability (0.45) is the sum of the probability that the computer has an Intel chip and a hard drive size <2 GB (0.05) and the probability that the computer has an Intel chip and a hard drive size >=2 GB (0.40). Similarly, the marginal probability that the computer has a hard drive size >=2 GB is 0.60, which is the sum of the probability that the computer has a hard drive size >=2 GB and has an Intel processor (0.40), and the probability that the computer has a hard drive size >=2 GB and has a Budget processor (0.20).

Determination of the conditional probabilities, listed below the table containing marginal probabilities, is slightly more complicated. The probability that the processor is an Intel, given that it is known that the hard drive size is >=2 GB, is notated as P(Intel|>=2 GB). This probability (0.67) is equal to the probability that the computer has an Intel chip and a hard drive size >=2 GB (0.40), divided by the marginal probability that the computer has a hard drive size >=2 GB (0.60). Conceptually, this probability tells us that if we know that the hard drive size is >=2 GB, then we can expect the processor will be an Intel with probability of 0.67.

These marginal and conditional probabilities, in addition to the information in the exemplary Benefit table of FIG. 5, can be used to determine the expected payoffs to inspection of the computer. Information like that listed in the exemplary Benefit table could be returned by activity 4400. The Benefit table lists the expected revenues earned, by channel ("Online Auction" or "Liquidation") for all possible combinations of variable values. The Benefit table also lists the expected revenue earned by channel if the value of one or both of the variables is identified.

The expected revenue earned by channel for each combination of variable values can be uncovered using linear regression analysis. For example, to uncover the revenue-value combinations for a specific online auction site, historical computer prices from this site can be regressed on all the possible combinations of values. In this example, there are nine possible combinations of values for a computer: (Intel, >2 GB), (Intel, <2 GB), (Intel, unchecked), (Budget, >2 GB), (Budget, <2 GB), (Budget, unchecked), (unchecked, >2 GB), (unchecked, <2 GB), (unchecked, unchecked). Since there are two possible channel values in this example—online auction and liquidation—there are 18 (=2×9) different possible benefit-value combinations in the Benefit table.

Reading through the Benefit table, lines 1 and 2 show the expected revenue earned at an online auction site (line 1) and from a liquidator (line 2) if a computer is sold with a known Intel processor and a known hard drive size of >=2 GB. Lines 3 and 4 show the expected revenues at an online auction site (line 3) and from a liquidator (line 4) if a computer is sold with a known Intel processor and a known hard drive size of <2 GB. Lines 5 and 6 show the expected revenues at the online auction site (line 5) and liquidation (line 6) if the processor type is known to be Intel but the size of the hard drive is NOT identified. This does not mean that the hard drive is missing. Rather, it means that the hard drive size, which might be either <2 GB or >=2 GB, has not been identified at the time of the sale. The remaining 12 lines in this Benefit table show the expected revenue, by channel, for the remaining combinations of values of the processor and hard disk size variables, including the possibility that one or more of the variables is unchecked.

Directly from the Benefit table, it is possible to determine an initial optimal selling channel for a computer having any combination of the listed values. For example, if it is known that a computer has an Intel processor and a hard drive size >=2 GB, then the Benefit table shows that the computer should be sold at an online auction rather than a liquidator; the expected revenue from an online auction is $200 (line 1) while the exact same computer would yield an expected revenue of only $120 (line 2) from a liquidator. For a different example, consider the case where neither the processor type nor the hard drive size is inspected prior to sale. This computer will yield an inspected revenue at an online auction site of $30 (line 17), while the expected revenue from a liquidator for this exact same computer is $50 (line 18). Therefore, according to the Benefit table, a computer with neither the processor type nor the hard drive inspected should be sold to a liquidator.

For each possible combination of values for the variables of processor type and hard drive size, the information in this Benefit table can be used to determine the initial optimal sales channel as follows:

(Intel, >=2 GB) computer should be sold at online auction (expected benefit of $200 compared to $120), (Intel, <2 GB) should be sold at an online auction ($150 compared to $90), (Intel, unchecked) should be sold at an online auction ($100 compared to $70), (Budget, >=2 GB) should be sold at an online auction ($100 compared to $90), (Budget, <2 GB) should be sold to a liquidator ($70 compared to $60), (Budget, unchecked) should be sold to a liquidator ($60 compared to $40), (unchecked, >=2 GB) should be sold at an online auction ($140 compared to $100), (unchecked, <2 GB) should be sold at online auction ($90 compared to $80), and (unchecked, unchecked) should be sold to a liquidator ($50 compared to $30).

Although the exemplary Benefit table of FIG. 5 enables the determination of an initial optimal sale channel for a computer having any combination of the listed values after all inspection has taken place (if inspection actually occurs), this Benefit table does not determine whether inspection of the value of one and/or both variables should occur.

In order to determine whether or not inspection of the processor type should occur at all, the optimization engine can "work backwards". That is, the optimization engine can first calculate expected benefits and expected costs associated with the inspection of the hard drive size assuming that the processor type has already been uncovered, and then with these calculations in hand, determine whether or not the hard drive size should be inspected at all.

FIG. 6 provides an example analysis showing how this process can work. Suppose we have already inspected the processor type and know that it is an Intel, as shown in Scenario 1. The remaining decision regards whether or not to inspect the hard drive size. If a hard drive size >=2 GB is uncovered, then the computer should be sold at an online auction—this is the channel yielding the maximal expected benefit for an (Intel, >=2 GB) computer—and the expected benefit from this channel is $200. Given it is known that the processor is an Intel, the probability that a hard drive size >=2 GB is uncovered is P(>=2 GB|Intel), 0.89. Similarly, if a hard drive size <2 GB is uncovered, which occurs with probability P(<2 GB|Intel)=0.11, then the optimal channel for this computer is an online auction as before, but the expected benefit is only $150.

Therefore, prior to inspection of the size of the hard drive, the expected benefit from inspection is (0.89)*$200+(0.11)*$150=$194.50. After inspection occurs, the expected benefit will be either $200 (if the hard drive is >=2 GB) or $150 (if <2 GB), but prior to inspection the expected benefit is $194.50.

If the size of the hard drive remains unchecked before bringing the computer to sale, the expected benefit from the optimal sales channel (in this case, a liquidator) is $100. Therefore, as long as the incremental cost of inspecting the hard drive given the processor type has already been inspected is less than $94.50, inspection of the hard drive causes an increase in expected profits. In this example, it is assumed that the incremental cost of inspecting the size of the hard drive is $30. This implies that inspection of the hard drive should ALWAYS occur if the processor type is known to be Intel. It also implies that, prior to inspection of the hard drive size, the expected benefit (net of inspection costs) of knowing that a computer has an Intel processor is $194.50–$30=$164.50.

Scenario 2 of FIG. 6 shows a similar analysis when it is known that the computer has a Budget processor. If a hard drive size >=2 GB is uncovered, then the computer should be sold at an online auction and the expected benefit is $100. Given the processor is known to be a Budget processor, the probability that a hard drive size >=2 GB is uncovered is P(>=2 GB|Budget), 0.36. Sirmilarly, if a hard drive size <2 GB is uncovered (occurs with probability P(<2 GB|Budget)=0.64) then the optimal channel for this computer is a liquidator and the expected benefit is $70.

Therefore, given it is known the processor is Budget but prior to inspection of the size of the hard drive, the expected benefit from inspection is (0.36)*100+(0.64)*70=$80.80. Analogous to Scenario 1, after inspection occurs the expected benefit will be either $100 (if the hard drive is >=2 GB) or $70 (if <2 GB), but prior to inspection the expected benefit is $80.80.

If the size of the hard drive remains unchecked before bringing the computer with a known Budget processor to sale, the expected benefit from the optimal sales channel (in this case, a liquidator) is $60.

Therefore, when the processor is known to be Budget the hard drive size is NEVER inspected. This is because the $30 cost of inspection outweighs the gain: $80.80–$60=$20.80.

At this point it is known that if the processor is inspected and found to be Intel, the expected remaining net benefit is $164.50 ($194.50–$30), while if the processor is inspected and found to be a Budget, the expected remaining net benefit is $60.

Prior to inspection of the processor type, the probability that an Intel computer is inspected is 0.45 implying that the probability that a Budget computer is inspected is 0.55. Given the cost of inspecting the processor type is $20, the expected total net benefit of inspecting the processor type is $$(0.45)*\$164.44+(0.55)*\$60-\$20=\$87,$$

where 0.45 is the probability the computer has an Intel processor, $164.44 is the expected remaining net benefit of inspection given the computer has an Intel processor, 0.55 is the probability the computer has a Budget processor, $60 is the expected remaining net benefit of inspection given the computer has a Budget processor, and $20 is the assumed incremental cost of inspecting the processor speed.

Whether or not inspection of the processor should occur depends on the expected remaining benefits if inspection of the processor does not occur.

Consider the outcome if the processor speed is unchecked. The size of the hard drive can still be inspected. If the hard drive is inspected and found to be >=2 GB, it should be sold at online auction (the optimal selling channel) for an expected benefit of $140 (line 13, Table B). If the hard drive is inspected and found to be <2 GB, it should be sold at online auction (the optimal selling channel) for an expected benefit of $90 (line 15). The probability that the hard drive size is >=2 GB given that the processor type is unknown is the marginal probability P(>=2 GB), which equals 0.60. Therefore, the expected remaining benefit of inspecting the hard drive given the processor type is unknown equals (0.60)*($140)+(0.40)*$90=$120. Since the incremental cost of inspecting the hard drive is assumed to be $30, the expected remaining net benefit is only $90. In contrast if neither the processor type nor the hard drive is inspected, the optimal sales channel is a liquidator, yielding an expected benefit of $50. Since $50 is less than $90, if the processor speed is unchecked the hard drive size should still ALWAYS be checked, and, the expected remaining net benefit of a computer with an unchecked processor speed is $90.

Returning to the issue about whether the processor speed should be checked, the expected benefit of inspecting the processor speed is $87 while the expected benefit of a computer with an unchecked processor speed is $90. Therefore, the analysis suggests that, prior to inspection, the processor speed should NOT be inspected, but, the hard drive size should be inspected. Thus, for this example, processor speed is not an optimal item variable, but hard drive size is an optimal item variable.

Because the analysis of this example yields only one optimal item variable, there is no optimal order in which to inspect that one optimal variable. Because incremental inspection costs can depend upon what has already been inspected, however, situations where more than one optimal item variable results can also result in an optimal order in which to inspect those optimal item variables.

One of ordinary skill in the art will instantly recognize that the approach illustrated in FIGS. 5 and 6 can be extended to consider any computationally reasonable number of channel and/or item variables and/or values. By doing so, it can be determined, before a personal computer is inspected, what variables to inspect, and in what order. Moreover, based on the results of that inspection (or the pre-inspection determination if the decision is reached to inspect no variables) and a comparison of expected costs to expected benefits, any number the optimal channel values can be determined.

In addition, one of ordinary skill in the art will instantly recognize that, using a similar approach to that detailed in the preceding examples, other optimal variables and/or values can be determined, including, for example, those related to handling, inventory, terms the sale, item warranties, packaging, shipment, etc.

Learning and Randomization

Finally, note that the optimization engine need not optimally decide to inspect the optimal item variables identified at activity 4600 of FIG. 4. Similarly, the optimization engine need not decide to sell an item on the channel having the optimal channel values identified at activity 4800 of FIG. 4. Instead, the optimization engine can occasionally and/or purposefully make what appears to be a random and/or non-optimal inspection, channel, and/or other decision. The optimization engine can make these potentially non-optimal decisions so the resulting costs and/or benefits can be gathered and used to update the data and/or database upon which the optimization engine relies. This new data can be particularly beneficial when the database is populated with data that is not fully trusted, such as estimated data, data gathered from a potentially non-representative sample, and/or potentially outdated data. Moreover, such adaptive learning can allow method 40 to further optimize item inspection, channel determination, etc., thereby potentially leading to higher long-term profits for a practitioner of method 40.

Financial Intermediaries

An alternative embodiment of method 10 involves the bailee serving as an servicer and/or agent to a financial intermediary, rather than a merchant. In this embodiment, the financial intermediary can promote its financial instrument as a purchasing means via which purchasers can be assured that purchases can be returned.

As an example, an issuer of a credit card, such as Visa, could provide users of its card with a "purchase protection plan" via which items purchased with the card could be returned to the bailee. A purchaser who is unsatisfied with a purchased item could contact Visa to obtain a return authorization, and take and/or send the item to the bailee. Upon reported receipt of the item by the bailee, Visa could credit the purchaser's Visa account with the purchase price of the item.

Numerous variations on this example can also be visualized. For example, certain and/or all returns could be pre-authorized by the financial intermediary. As another example, the purchaser could contact the financial intermediary and/or the bailee via, for example the Internet, to obtain a return authorization.

As yet another example, the "return" could be in actuality a repossession, triggered by a default on payment for the purchased item or some other contract breach. The item could be returned because it is at the end of its contractual life, such as in the case of a leased item. The item could also be returned for repair and/or servicing, or could be a returned loaner. Further, the item could be an unexecuted gift certificate or store credit.

In any event, the financial intermediary and/or the bailee can determine the rules for returns (e.g., time limits, condition of item, valuation of return, when authorization is required, return fees, etc.)

The provision of such a service can provide many advantages. A financial intermediary offering such a service can gain a marketing advantage whereby it can distinguish itself from its competitors. Consumers can be assured of a uniform return policy that is independent of the merchants from whom they originally purchased. Merchants can be rid of the difficulties associated with handling returns, and/or with authorizing returns being made to the bailee.

There are a number of types of financial intermediaries who could participate in this embodiment. These intermediaries could include any credit card issuer, such as Visa, MasterCard, American Express, Discover, etc.; First USA, Capital One, Chase, etc.; JC Penney, Macy's, Nordstrom, etc.; and/or banks, credit unions, trading firms, leasing companies, insurance companies, warranty companies, etc.

Thus, an embodiment of the invention can provide a method for re-selling a previously-purchased item. The method can include receiving from a financial intermediary, through whom a first purchaser financed a purchase of the item, an authorization to facilitate the reselling of the item by the first consumer, and receiving the previously-purchased item. The method can also include offering the item for sale via an Internet auction site and selling the item to a second consumer.

Still other advantages of the present invention will become readily apparent to those skilled in this art from the above-recited detailed description. Accordingly, the drawings and descriptions are to be regarded as illustrative in nature, and not as restrictive. For example, the optimization engine can be adapted to automatically alert known potential bulk buyers when a large shipment is expected and/or arrives. As another example, the system's auction site and/or system can automatically sell an item to a second highest bidder if the first highest bidder can not complete a purchase, which might occur, for example, if the first highest bidder's attempted credit card payment transaction for the purchase is rejected by the credit card issuer.

What is claimed is:

1. A processor-assisted method for selecting, for a specific item, a sales channel from among a plurality of sales channels, comprising the steps of:

obtaining a request for listing a specific item on one of a plurality of sales channels, the specific item having associated therewith item variables and values for the item variables, the plurality of sales channels each having associated therewith channel variables with corresponding channel values;

with a processor, analyzing real-time data and historical sales data for a set of item representing previously listed items and the plurality of sales channels using the values for the item variables of the specific item, including the steps of:

performing statistical analysis on the real-time data and the historical sales data to identify statistically significant item variables and channel variables that impact cost and/or benefit for listed items, the step of performing statistical analysis comprising the steps of using the number of occurrences of each of a set of keywords in a textual description of each item to perform a linear regression analysis for determining the impact of each keyword in the textual description of an item on a selling price of the item; and identifying each keyword that has a statistically significant correlation to selling price as corresponding to a significant item variable;

deriving optimized values for the statistically significant item variables and channel variables that result in an optimal combination of expected cost and expected benefit for the specific item when listed; and offering the specific item for sale using the statistically significant item variables and channel variables and the corresponding optimized values, the optimized values identifying one of the plurality of sales channels.

2. The method of claim 1, wherein at least one of the item variables include as a value a textual description, and the step of performing statistical analysis comprises the step of analyzing the textual description to derive statistical data based on occurrences of keywords.

3. The method of claim 2, wherein the step of performing statistical analysis comprises the step of employing statistical analysis on channel values representing descriptions and/or listing characteristics to identify the one or more statistically significant channel variables associated with the set of items.

4. The method of claim 2, wherein the step of performing statistical analysis comprises the step of employing statistical textual analysis on descriptions of each item in the set of items to identify the one or more statistically significant item variables associated with the set of items.

5. The method of claim 1, wherein the step of analyzing comprises the step of determining a channel value from at least one keyword identified as having a statistically significant correlation to selling price.

6. The method of claim 1, wherein the step of analyzing comprises the step of determining an item variable value from at least one keyword identified as having a statistically significant correlation to selling price.

7. The method of claim 1, wherein the step of analyzing comprises the step of determining an item variable from at least one keyword identified as having a statistically significant correlation to selling price.

8. The method of claim 1, wherein the step of deriving optimized values comprises the step of analyzing every combination of values for the statistically significant channel variables and item variables present in the real-time data and historical sales data.

9. The method of claim 1, further comprising the step of generating inspection criteria for the set of items based on the identified statistically significant item variables and channel variables.

10. The method of claim 9, further comprising the steps of:
receiving new item variable values in response to the generated inspection criteria; and
recalculating optimized values for the statistically significant item variables and channel variables based on the new item variable values received.

11. The method of claim 1, wherein the expected benefit is automatically adjusted for one or more of sales effects, seasonal effects, product aging, price fluctuation, and channel flooding effects.

12. The method of claim 1, further comprising the step of statistically determining the expected cost and expected benefit of each combination of channel values and values for the item variables.

13. The method of claim 1, wherein at least a portion of the expected cost is associated with inspecting the item.

14. The method of claim 1, further comprising the steps of forecasting expected availability of the item, and adjusting the expected benefit to reflect expected availability of the item.

15. The method of claim 1, wherein the step of performing statistical analysis comprises the step of using one or more probability tables to compute expected cost or expected benefit.

16. The method of claim 1, wherein the step of performing statistical analysis comprises the steps of generating marginal or conditional probabilities related to item variable values and/or combinations thereof, and using the generated probabilities to compute expected cost or expected benefit.

17. The method of claim 1, wherein the step of performing statistical analysis comprises the steps of:
mapping non-numeric channel values for a particular channel variable to a set of numeric values; and
performing the statistical analysis using the numeric values obtained from the mapping.

18. An apparatus using a processor for selecting a sales channel, wherein the processor uses the steps:
obtaining a request for listing a specific item on one of a plurality of sales channels, the specific item having associated therewith item variables and values for the item variables, the plurality of sales channels each having associated therewith channel variables with corresponding channel values;

with a processor, automatically analyzing real-time data and historical sales data for previously listed items and the plurality of sales channels using the values for the item variables of the specific item, including the steps of:

performing statistical analysis on the real-time data and the historical sales data to identify statistically significant item variables and channel variables that impact cost and/or benefit for listed items, the step of performing statistical analysis comprising the steps of using the number of occurrences of each of a set of keywords in a textual description of each item to perform a statistical analysis for determining the impact of each keyword in the textual description of an item on a selling price of the item; and identifying each keyword that has a statistically significant correlation to selling price as corresponding to a significant item variable;

deriving optimized values for the statistically significant item variables and channel variables that result in an optimal combination of expected cost and expected benefit for the specific item when listed; and offering the specific item for sale using the statistically significant item variables and channel variables and the corresponding optimized values, the optimized values identifying one of the plurality of sales channels.

* * * * *